United States Patent
Mayhew et al.

(10) Patent No.: US 9,438,886 B2
(45) Date of Patent: Sep. 6, 2016

(54) PARALLAX SCANNING METHODS FOR STEREOSCOPIC THREE-DIMENSIONAL IMAGING

(75) Inventors: Christopher A. Mayhew, Oakton, VA (US); Craig M. Mayhew, Herndon, VA (US)

(73) Assignee: VISION III IMAGING, INC., Vienna, VA (US)

( * ) Notice: Subject to any disclaimer, the term of this patent is extended or adjusted under 35 U.S.C. 154(b) by 706 days.

(21) Appl. No.: 13/639,330

(22) PCT Filed: Apr. 7, 2011

(86) PCT No.: PCT/US2011/031568
§ 371 (c)(1),
(2), (4) Date: Dec. 17, 2012

(87) PCT Pub. No.: WO2011/127273
PCT Pub. Date: Oct. 13, 2011

(65) Prior Publication Data
US 2013/0113891 A1    May 9, 2013

Related U.S. Application Data

(60) Provisional application No. 61/321,862, filed on Apr. 7, 2010.

(51) Int. Cl.
*H04N 13/02* (2006.01)

(52) U.S. Cl.
CPC ...... *H04N 13/0239* (2013.01); *H04N 13/0296* (2013.01); *H04N 13/0246* (2013.01)

(58) Field of Classification Search
None
See application file for complete search history.

(56) References Cited

U.S. PATENT DOCUMENTS

| | | | |
|---|---|---|---|
| 5,510,831 A | 4/1996 | Mayhew | |
| 6,324,347 B1 | 11/2001 | Bacs, Jr. et al. | |
| 2002/0131170 A1* | 9/2002 | Costales | G02B 21/22 359/464 |
| 2005/0253924 A1* | 11/2005 | Mashitani | H04N 13/0275 348/42 |
| 2007/0147671 A1* | 6/2007 | Di Vincenzo | H04N 13/0011 382/128 |
| 2008/0002201 A1* | 1/2008 | Morita | G01J 4/04 356/364 |
| 2008/0178232 A1* | 7/2008 | Velusamy | H04N 5/23203 725/88 |
| 2009/0074398 A1* | 3/2009 | Mayhew | G02B 5/005 396/324 |

OTHER PUBLICATIONS

International Search Report from the European Patent Office for International Application No. PCT/US2011/031568, mailed Jul. 1, 2011.

(Continued)

*Primary Examiner* — Eileen Adams
(74) *Attorney, Agent, or Firm* — The Marbury Law Group, PLLC

(57) ABSTRACT

A method of using two parallax scanning lenses to capture left and right points of view for stereoscopic three-dimensional display. The method includes establishing first and second parallax scanning points of view and overlapping fields of view of a subject volume including a region of interest. The method includes reading at least one scene parameter associated with the field of view of the subject volume. The method includes determining stereoscopic and parallax scanning setting based on a value(s) derived from at least one scene parameter. The method also includes computer generating and storing virtual parallax scanning stereoscopic imagery.

16 Claims, 12 Drawing Sheets

(56) References Cited

OTHER PUBLICATIONS

Mayhew, C. A. et al., "Three-Dimensional Visualization of Geographical Terrain Data Using Temporal Paraflax Difference Induction," Proceedings of SPIE—The International Society for Optical Engineering—Proceedings of SPIE-IS and T Electronic Imaging—Human Vision and Electronic Imaging XIV 2009, SPIE, vol. 7240, pp. 72401H-1 to 72401H-11, XP-002576988, (2009).

* cited by examiner

Figure 4 (Clockwise Parallax Scanning Iris)
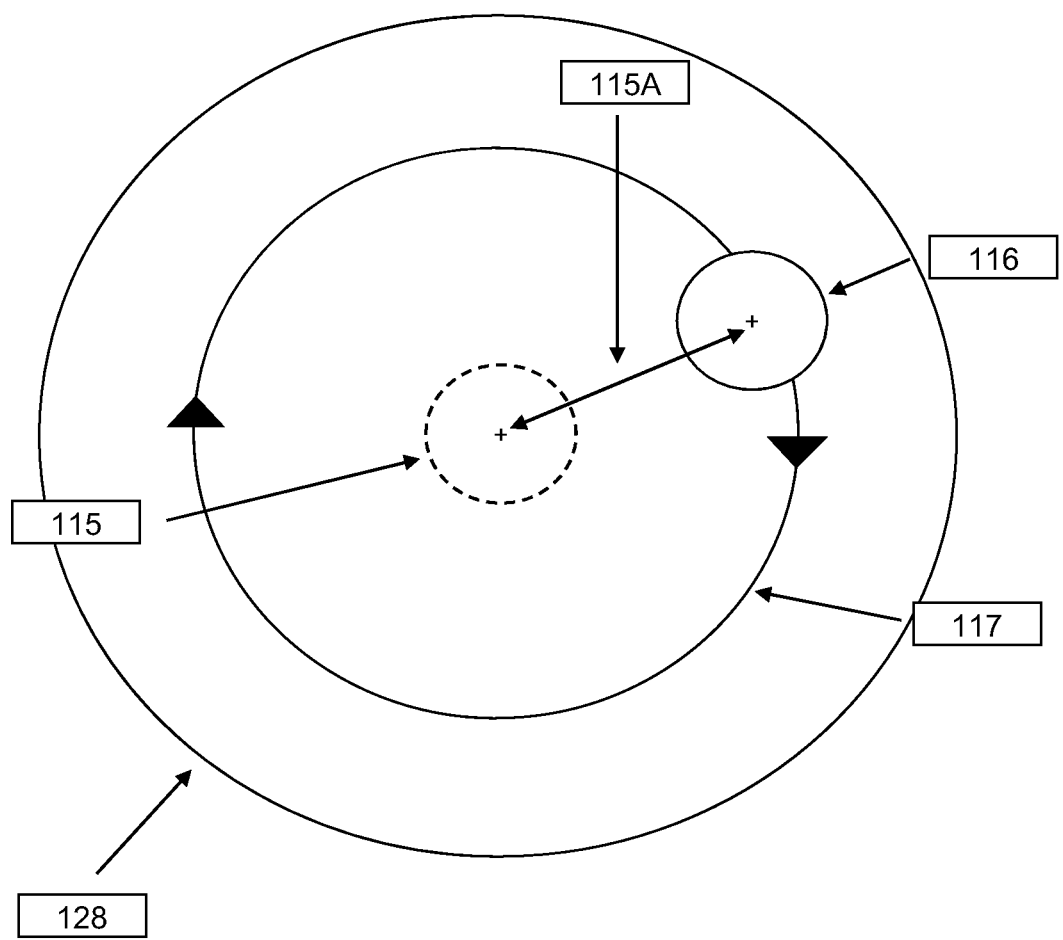

4.8 Hz 5 FRAME @ 24 FPS

| FRAME RATE | 24 | 30 |
|---|---|---|
| FREQUENCY | 4 | 4 |
| FRAME 1 POLA | 60 | 48 |
| FRAME 2 POLA | 120 | 96 |
| FRAME 3 POLA | 180 | 144 |
| FRAME 4 POLA | 240 | 192 |
| FRAME 5 POLA | 300 | 240 |
| FRAME 6 POLA | 0 | 288 |
| FRAME 7 POLA | 60 | 336 |
| FRAME 8 POLA | 120 | 24 |
| FRAME 9 POLA | 180 | 72 |
| FRAME 10 POL | 240 | 120 |
| FRAME 11 POL | 300 | 168 |
| FRAME 12 POL | 360 | 216 |
| FRAME 13 POLAR CORD. | | 264 |
| FRAME 14 POLAR CORD. | | 312 |
| FRAME 15 POLAR CORD. | | 360 |

| FRAME RATE | 24 |
|---|---|
| FREQUENCY | 4.4 |
| FRAMES PER C | 5.454545 |

Figure 5A
(POSSIBLE PARALLAX SCAN PATHS)
EXAMPLE 1
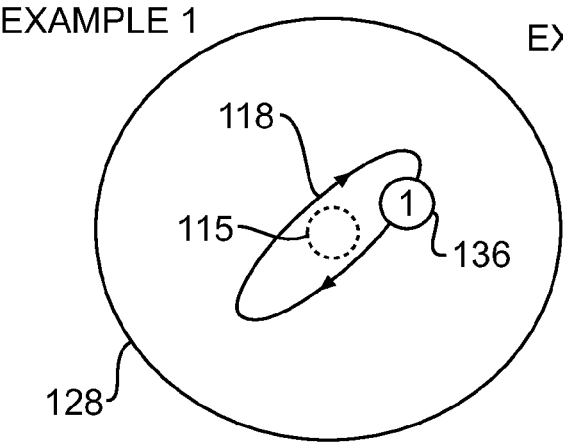
EXAMPLE 2
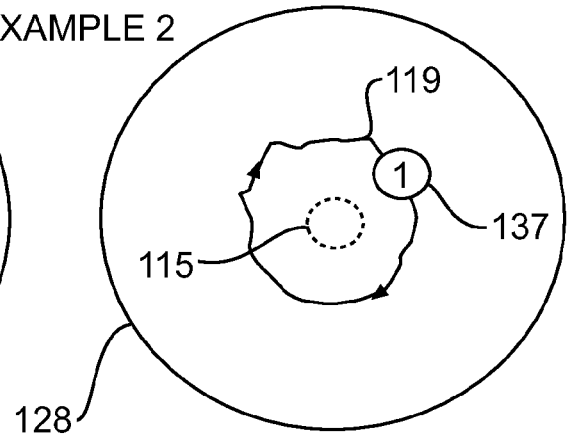
EXAMPLE 3
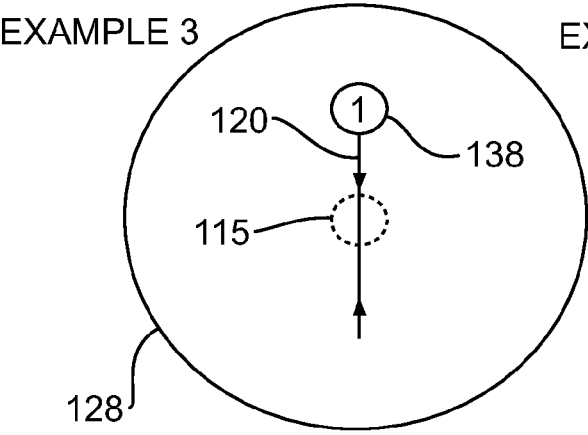
EXAMPLE 4
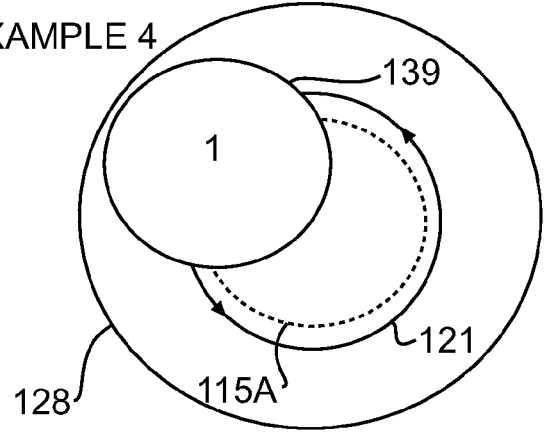

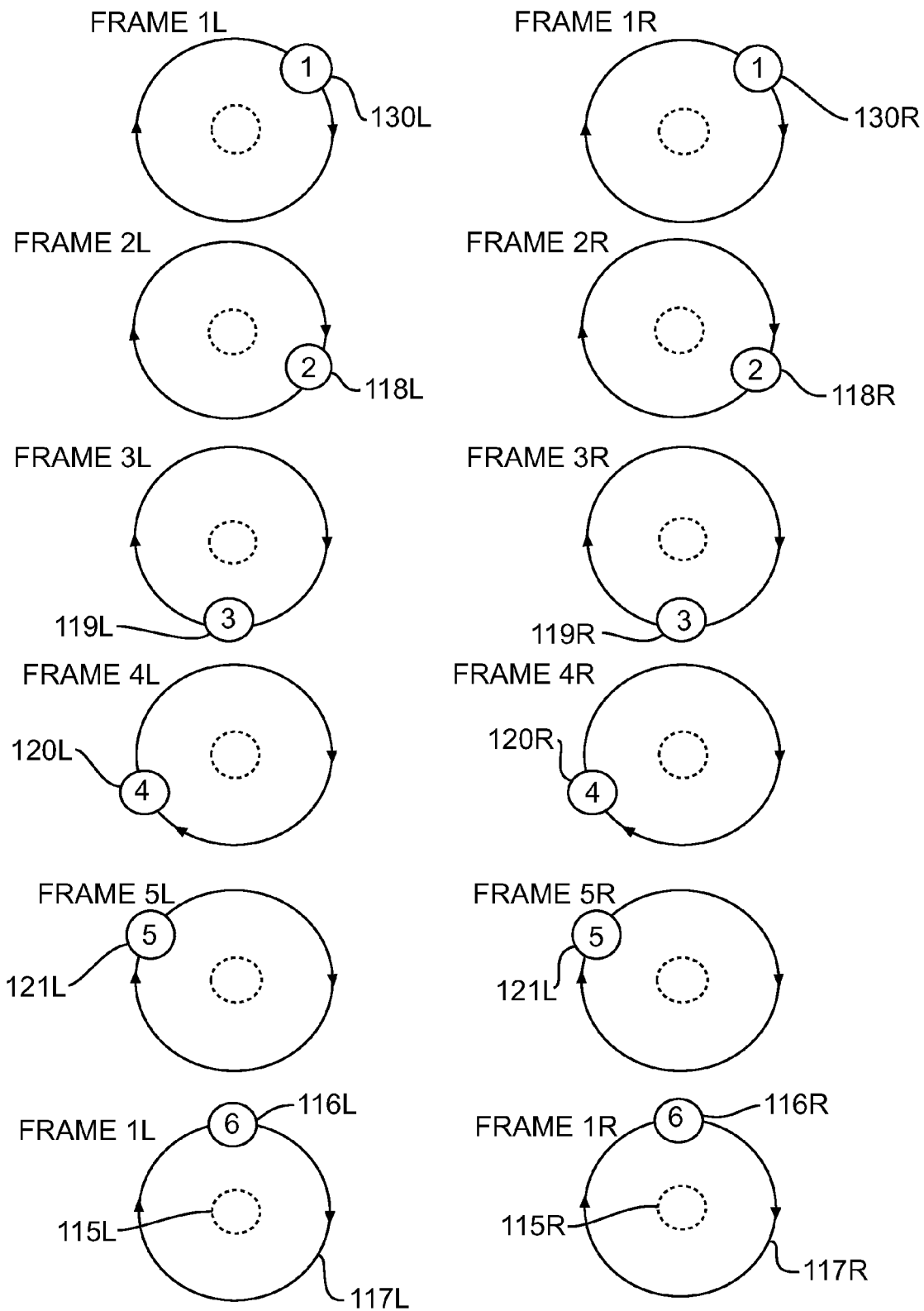

(SYNCHRONOUS CLOCKWISE AND COUNTER CLOCKWISE PARALLAX SCANNING IRISES)

(CLOCKWISE PARALLAX SCANNING IRISES 180 DEG. OUT OF PHASE)

PARALLAX SCANNING METHODS FOR STEREOSCOPIC THREE-DIMENSIONAL IMAGING

This application claims the benefit of priority under 35 U.S.C. §119(e) of U.S. Provisional Application No. 61/321,862, filed Apr. 7, 2010, which is incorporated by reference herein in its entirety.

TECHNICAL FIELD

The presently disclosed embodiments relate to the psychophysics of human visual perception, stereoscopic imaging techniques and, more particularly, to systems and methods for capturing stereoscopic information from parallax scanning points of view.

BACKGROUND

Ever since early humans drew images of their world on cave walls, mankind has endeavored to create images of the environment in which we live. Over the subsequent several millennia, man continued to develop his image recording techniques. With the exceptions of sculpture and other carvings the majority of images were recorded on two-dimensional surfaces, like those of paintings or tapestries. Over time, artisans succeeded in developing perspective and chiaroscuro techniques to add a greater sense of depth to their two-dimensional works.

In the early part of the nineteenth century artistic skills were augmented with mechanical and chemical advancements, as well as a better understanding of human visual mechanics. Charles Wheatstone realized that each of the human eyes viewed an object from a slightly different horizontal point of view. Armed with this knowledge, he invented the stereoscope in 1832. His invention was the birth of stereoscopic imaging.

The ensuing discovery of the physiological phenomenon of persistence of vision led to the invention of parlor devices like William Horner's zoetrope (patented 1834) that allowed the viewing of images with the illusion of movement.

The invention of Daguerreotype photography in 1839 by Louis Daguerre, as well as the subsequent development by William Henry Fox Talbot of a system of negative recording and positive reproduction, allowed for the accurate documenting of real images on a two-dimensional surface. In 1849, the Scottish physicist David Brewster developed the Stereopticon, a convenient device for viewing stereoscopic photographs.

The latter part of the 1800's saw the development of flexible photographic film by George Eastman and a workable motion picture camera/projection system by Thomas Edison's New Jersey laboratories. On Dec. 28, 1895, the Lumieres brothers held the first public screening of Cinematographe films at the Grand Cafe, Boulevard des Capucines, Paris, and the movies were born. Shortly thereafter, British film pioneer William Friese-Greene filed a patent for a stereoscopic movie process consisting of two films projected side by side on screen and viewed through a stereoscope to converge the two images.

A. A. Campbell Swinton, a Scottish electrical engineer, outlined in 1906 a method that laid the foundation for the modern television. By 1932, the Radio Corporation of America (RCA) had demonstrated a 120-line resolution, all-electric television system.

In the hundred years from 1832 to 1932, the world saw the development and successful marketing of the fundamental systems for two-dimensional and three-dimensional stereoscopic motion pictures and television systems. This period established the human perceptual mechanisms whose building blocks are the basis for all modern image capture and display technologies.

The recent development of cost effective portable computers, high speed Internet, digital imaging, and high speed/capacity digital storage and multi format flat screen displays has made motion imagery ubiquitous. Technology now allows everyone to have a television/phone/computer/music player/etc. in their pocket.

Despite the continued advances in digital imaging and display technologies, the basic underlying human psychophysical visual mechanics that are exploited to create the perception of three-dimensions has remained unchanged for the last one hundred fifteen plus years.

Human Visual Mechanisms

Visual perception is the interpretation by the brain of what the eyes see. Human brains have certain innate visual mechanisms to assist in process of perception. These mechanisms include a propensity to make certain assumptions about the images that are being seen based on limited information. Examples of this include certain human visual mechanisms having to do with recognition and object occlusion.

Humans perceive images on displays devices like television and computer monitors because the devices present information in a manner that exploits certain visual mechanisms that have to do with motion and color perception. Images displayed on television, in motion pictures, and on computers do not continuously move. Instead, these devices present a series of still images with spatial separations in a manner that can be perceived by the brain as fluid movement.

Color displays also work in a comparable manner. Humans may be able to perceive millions of colors on a computer monitor, but the monitor itself produces only three particular colors, namely red, green, and blue. The illusion of additional colors are produced by presenting these three colors in a particular relationship to one another that exploits certain color visual perception mechanisms and thereby creating the illusion of a full spectrum of colors.

It is known that the act of visual perception is a cognitive exercise and not merely a stimulus response. In other words, perception is a learned ability which we develop from infancy. Binocular vision is the preferred method for capturing parallax information by humans and certain animals. However, other living organisms without the luxury of significant overlapping fields of view have developed other mechanisms to determine spatial relationships.

Certain insects and animals determine relative spatial depth of a scene by simply moving one eye from side to side or up and down. A pigeon bobbing its head back and forth as it walks is a good example of this action. The oscillating eye movement presents motion parallax depth information over time. This allows for the determination of depth order by the relative movement of objects in the scene. Humans also possess the ability to process visual parallax information presented over time.

The fundamentals of human sight are based on the fact that we have two eyes that look forward with visual fields that overlap. The eyes focus on an object by a means called accommodation. This function is performed simultaneously with a convergence of the eyes. Each eye records a two-dimensional image of the object from a slightly different point of view (or "parallax position") on to the retinas. The two two-dimensional images are transmitted along the optical nerves to the brain's visual cortex and fused over time into a three-dimensional perception of the object through a process called stereopsis. The object's three-dimensionality exists only in the brain—not in the eyes.

Humans are able to perceive two-dimensional photographs, graphics, television and motion pictures because we have all learned to read three-dimensionality into a two-dimensional image using monocular cues like linear perspective, overlapping images, motion, relative size, and light and shadow cues. However, monocular cues only provide a limited amount of dimensional and spatial information. True three-dimensionality requires the addition of parallax depth information.

Methods and apparatus for producing three-dimensional illusions have to some extent paralleled the increased understanding of the physiology of human depth perception as well as developments in image manipulation through analog/digital signal processing and computer imaging software.

Perception of three-dimensional space depends on various kinds of information in the scene being viewed including monocular cues and binocular cues, for example. Monocular cues include elements such as relative size, linear perspective, interposition, highlights, and shadows. Binocular cues include retinal disparity, accommodation, convergence, and learned cues including a familiarity with the subject matter. While all these factors may contribute to creating a perception of three-dimensional space in a scene, retinal disparity may provide one of the most important sources of information for creating a three-dimensional perception. Particularly, retinal disparity results in parallax information (i.e., an apparent change in the position, direction of motion, or other visual characteristics of an object caused by different observational positions) being supplied to the brain. Because each eye has a different observational position, each eye can provide a slightly different view of the same scene. The differences between the views represent parallax information that the brain can use to perceive three dimensional aspects of a scene. In addition to parallax, there are several visual system sub-processes that also contribute to the mechanics of perception.

A distinction exists between monocular depth cues and parallax cues in the visual information received. Both eyes provide essentially the same monocular depth cues, but each eye provides different parallax depth information, a difference that is essential for producing a true three-dimensional perception. Depth information may be perceived, to a certain extent, in a two-dimensional image. For example, monocular depth may be perceived when viewing a still photograph, a painting, standard television and movies, or when looking at a scene with one eye closed. Monocular depth is perceived without the benefit of binocular parallax depth information. Such depth relations are interpreted by the brain from monocular depth cues such as relative size, overlapping, perspective, and shading. To interpret monocular depth information from a two-dimensional image (i.e., using monocular cues to indicate a three-dimensional space on a two-dimensional plane), the viewer is actually reading depth information into the image through a process learned in childhood.

As previously stated, three-dimensional visual perception is a series of cognitive exercises built on fragmentary information. In his 1995 book, *Foundations of Vision*, hereby incorporated by reference, Brian Wandell states, Perception is an interpretation of the retinal image, not a description.

Information in the retinal image may be interpreted in many different ways. Because we begin with ambiguous information, we cannot make deductions from the retinal image, only inferences . . . we have learned that the visual system succeeds in interpreting images because of statistical regularities present in the visual environment and hence in the retinal image. These regularities permit the visual system to use fragmentary information present in the retinal image to draw accurate inferences about the physical cause of the image. For example, when we make inferences from the retinal image, the knowledge that we live in a three-dimensional world is essential to the correct interpretation of the image. Often, we are made aware of the existence of these powerful interpretations and their assumptions when they are in error, that is, when we discover a visual illusion.

In addition, the following publications regarding three-dimensional perception are also herein incorporated by reference:
1. Rock, I. *The Logic of Perception*. Cambridge, Mass.: MIT Press, 1985.
2. Churchland, P. et al. *The Computational Brain*. Cambridge, Mass.: MIT Press, 1992.
3. Tomlin, P. "Maintaining the Three-dimensional Illusion." *Information Display*, Dec. 1987:11-14
4. Ogle, K. N. "Some Aspects of Stereoscopic Depth Perception." *Journal of the Optical Society of America* 57, no. 9 (1967): 1073-1081.
5. Marr, D. Vision. San Francisco: W. H. Freeman, 1982.
6. Jones, E. et al. "Visual Image Depth Enhancement by Parallax Induction." *Advances in Display Technology IV, SPIE Proceedings*. Society of Photo-Optical Instrumentation Engineers, 1984. 16.
7. McLaurin, A. P. et al. "Visual Image Depth Enhancement Process: An Approach to Three-Dimensional Imaging." *Displays* 7, no. 3 (1986): 112.
8. Mayhew, C. A. "Texture and Depth Enhancement for Motion Pictures and Television." *SMPTE Journal* 9, no. 10 (1990): 809-814.
9. Mayhew, C. A. "True 3-Dimensional Broadcast Television without Glasses." *NAB Engineering Proceedings*. Altanta, 1990. 478. (revised version)
10. Mayhew, C. A. "Vision III Single-Camera Autostereoscopic Methods." *SMTPE Journal* 100 (1991): 411-416.
Mayhew, C. A. "A 35 mm Autostereoscopic System for Live-Action Imaging Using a Single Camera and Lens." *SMTPE Journal* 102 (1993): 505-511.
12. Mayhew, C. A. "Parallax Scanning Using a Single Lens." *SPIE Stereoscopic Displays and Vitrual Reality Systems III Proceedings*. San Jose, 1996.154-160.
13. Proffitt, D. et al. "Perceived depth is enhanced with parallax scanning." University of Virginia—Cognitive Science Department, March 1999.
14. Subramanian, A. et al. "Segmentation and Range Sensing Using a Moving-Aperture Lens." *Proceedings of the 8th IEEE International Conference on Computer Vision (ICCV 2001)*. Vancouver, 2001.500-507.
15. Mayhew, C. A. et al. "Three-dimensional visualization of geographical terrain data using temporal parallax difference induction." Proc. of SPIE-IS&T Electronic Imaging, SPIE Vol. 7240, 72401H, San Jose, Calif., 2009
16. Serrano-Pedraza, P. et al. "Stereo vision requires an explicit encoding of vertical disparity." Journal of Vision, 9 (4):3. 1-13, Apr. 3, 2009.

17. Farell, B. "Orientation-Specific Computation in Stereoscopic Vision." The Journal of Neuroscience, Sep. 6, 2006-26(36):9090-9106
18. Teichert, T. et al "Depth perception during saccades." Journal of Vision, 8(14):27, 1-13, Dec. 23, 2008.
19. Pylyshyn, Z. W. "Seeing and Visualizing" Massachusetts Institute of Technology 2003.

A visual sensation becomes a perception by an unconscious association and interpretation of ideas held in memory. The visual order of perception is reflected by a learned knowledge of the environment that is based on subjective experience. This presents an ability to view the world with an understanding made possible by the processing of sensate experience into representations that have meaning. Intangible connections between stimulus and sensation are organized into signs that have meaning by corresponding to reality in a manner that is thought to be similar to the way words do in speech. This is because humans use all kinds of visual data provided by the two eyes via a series of sub-process to make a perception. Bits of visual data are assigned meaning and used to create a unified three-dimensional perception of the surrounding world. As humans encounter different forms of visual data through day-to-day experiences, new meanings and signs are developed to accommodate an on going perception.

The human eyes are dynamic by their very nature. The eyes' gaze is never fixed or completely steady. The eyes are designed to constantly scan a scene to maintain and refresh the visual memory. This is, in part, due to the fundamental fact that the eyes are reasonably low resolution imagers. The function of the eyes in simple term is as follows: the retina is an area located at the rear of the eye on to which the eye's lens focuses an image. The retina is lined with specialized nerve cells called neurons that are light sensitive. The central region of the retina is called the fovea centralis or fovea. The fovea has the highest density neurons and therefore highest resolution. It is surrounded by several belts of neurons with diminishing density and therefore a diminishing resolution. The neurons that make up the retina feed information to the optic nerve which in turn connects to the visual cortex where an image perception takes place. Nearly 50% of the nerve fibers in the optic nerve carry information from the fovea, while the remaining 50% carry information from the neurons in the rest of the retina. The fovea comprises less than 1% of retinal area but the information it captures require as much as 50% of the brain's visual cortex to process. Humans maintain the perception of a sharp full field of view by constantly scanning the eyes and thereby the fovea a cross the scene being viewed.

The human eye is continuously scanning although these actions are generally imperceptible. This scanning action is called a saccade. The saccade serves in part to refresh the image being cast onto the fovea and surrounding retina at the back of the eye.

Current psychophysical and physiological evidence suggests that vertical disparities influence the perception of three-dimensional depth, but little is known about the perceptual mechanisms that support this process. Perhaps these perceptual effects are reconciled by a specific encoding of non-horizontal parallax. Whatever the specific mechanisms are, it is clear that the motion and gaze direction of the eyes contribute significantly to the process of three-dimensional sight.

Conventional thought is that because human have two eyes separated horizontally by an average distance of 65 mm (the interocular distance), two cameras capturing images in the same manner would work equally as well. However in the art of image capture, lens distortions, misalignments can cause vertical parallax. Vertical parallax is created by a misalignment of the two camera's points of view. This can be a cause of eyestrain. Conventional stereoscopic image capture goes to great lengths to avoid and/or eliminate any vertical parallax differences in the images. The stereoscopic production trend is also increasingly capturing images with disparities that are 50% or less than the human interocular (IO) of 65 mm. This trend is fueled, in part, by a desire to keep the images a comfortable range for the general viewing public. However, with less disparity comes less horizontal parallax and therefore less 3D effect. Less disparity also leads to a flattening of background scene elements. The addition of parallax scan information into the left and right image capture improves the overall perception of three-dimensionality in the final stereoscopic production. This is because the viewers have the benefit of the additional sub-process information with which to generate a more unified three-dimensional perception.

Under certain circumstances, conventional stereoscopic imagery is subject to being misinterpreted. Since the eyes gaze and saccade contribute additional information to the overall left/right binocular parallax three-dimensional perception, the absence of this information can cause the brain to "see" things as "odd" and unrealistic. Stereo perception created from two static horizontally separated left and right views can create a "cut out" 2D appearance for objects at various planes of depth. The subject volume looks three-dimensional, but the objects themselves appear flat. This is especially true if the images are captured using small IO disparities. A realistic visual scene contains multiple different disparities as captured by the eyes; imagery that contains only horizontal parallax creates a pseudo-stereoscopic perception.

The simple mechanics of conventional stereoscopic imaging provides the following variables to place the position in depth of a scene object (with regard to the plane of the screen):
Disparity between the two points of view (also known as interocular distance or IO)
Point of convergence of the two optical axis
An object's spatial position relative to the plane of the screen is determined by the amount of disparity and point of convergence. When the point of convergence is set behind an object in the foreground, the distance that the point of convergence is set behind that object and the amount of disparity between the two points of convergence will determine how far in front of the surface of the screen the object will be projected. The focal length of the lens and format of the capture medium will effect afore mentioned stereoscopic variables, but only in the amount required to achieve the same result.

Three-Dimensional Imaging

Several mechanical and/or electronic systems and methods exist for creating and/or displaying true three dimensional images. These methods have traditionally been divided into two main categories: stereoscopic display methods and autostereoscopic display methods. Stereoscopic techniques including stereoscopes, polarization, anaglyphic, Pulfrich, and shuttering technologies requiring the viewer to wear a special viewing apparatus such as glasses, for example. Autostereoscopic techniques such as holography, lenticular screens, and parallax barriers produce images with a three-dimensional illusion without the use of special glasses, but these methods generally require the use of a special screen.

The present disclosure is directed to an alternative approach to three-dimensional imaging. The approach described herein is centered on the concept of presenting parallax three-dimensional information over time in a manner that exploits human short-term visual memory, depth mapping, and other sub-processing visual perceptual mechanisms. Parallax scanning and square-wave switching methods have been developed to exploit parallax over time in a manner that is compatible with conventional media systems.

The process for conventional stereoscopic image capture and display is well known. Books like Lenny Lipton's 1982 *Foundations of the Stereoscopic Cinema* and Bernard Mendiburu's 2009 *3D Movie making: Stereoscopic Digital Cinema* detail the current approach to three-dimensional imagery capture and display, both of these publications are hereby incorporated by reference. Recent advances in digital imagery have improved the process of stereoscopic imaging, but the basic perception fundamentals remain the same throughout the various processes.

Other systems and methods have been developed that use square-wave switching and parallax scanning information to create autostereoscopic displays that allow a viewer to perceive an image as three-dimensional—even when viewed on a conventional display. For example, U.S. Pat. No. 5,991,551 discloses, inter alia, a method for a single camera to record images while undergoing a parallax scanning motion. The optical axis of a single camera is made to move in a repetitive pattern that causes the camera lens optical axis to be offset from a nominal stationary axis. This offset produces parallax information. The motion of the lens optical axis is referred to as parallax scanning. As the motion repeats over the pattern, the motion becomes oscillatory. At any particular instant, the motion may be described in terms of a parallax scan angle.

Over the years, the present inventors and their associates have developed a body of work based on methods (optical and synthetic) and apparatus that capture and display parallax information over time. U.S. Pat. Nos. 5,014,126, 4,815,819, 4,966,436, 5,157,484, 5,325,193, 5,444,479, 5,699,112, 5,933,664, 5,510,831, 5,678,089, 5,991,551, 6,324,347, 6,734,900, 7,162,083, 7,340,094, and 7,463,257 relate to this body of work and are hereby incorporated by reference. In addition, U.S. patent application Ser. Nos. 10/536,005, 11/547,714 and PCT Patent Application No. PCT/US2010/021627 are also related to this body of work and are hereby incorporated by reference.

Parallax scanning methods rely on discrete parallax differences between depth planes in a scene. The differences are caused by a parallax scan. When properly balanced (tuned) and displayed, the discrete parallax differences are perceived by the brain as depth.

A parallax scan records a pattern of sequential parallax views on a single strip of film or digital media. The lens's optical axis sweeps in the plane of the nominal X and Y axes around the nominal optical Z axis, pivoting on the optical convergence point (out along the Z axis), so that it passes through positions having parallax in relation to the optical convergence point. The circular scanning of the lens's optical axis traces out a coaxial cone pattern with the convergence point as its apex.

Perceptual tests revealed that the brain will translate parallax scanned information into depth information at scanning frequencies of between 3 and 6 Hz, and that the ideal frequency is 4.31 Hz. The scan pattern may be repeated with each cycle, or may change.

The digital parallax scanner (DPS) iris scanning mechanism is disclosed in U.S. patent application Ser. No. 11/547,714. Depending on the application, the assembly can be made of many different parts. One embodiment of the DPS employs two custom linear actuators and a central pivoting armature that holds the iris. The two parallel linear actuators have coordinated motion in such a way as to produce both x and y motions of the iris. For illustrative purposes think of the way a tank moves.

If both tank treads move forward/backward the "gun tip" moves forward/backward (both treads moving normally). If one tread moves opposite to the other (turning, both treads moving differentially) the "gun tip" would move left or right. It is this type of differential motion that allows the iris to be positioned in any area of the optical axis in the lens, and do it in the smallest possible space.

In the above design example, the linear actuators consist of a moving coil and fixed magnetic yoke assembly, very similar to the typical actuator that controls the read/write heads in a computer hard drive. By incorporating miniature, high-resolution optical encoders, PWM voice coil drivers, and a microcontroller, the entire scanner mechanism control system is completely digital.

Parallax information may also be incorporated into computer generated images, as described in the aforementioned U.S. Pat. No. 6,324,347 ("the '347 patent"). The '347 patent discloses, inter alia, a method for computer generating parallax images using a virtual camera having a virtual lens. The parallax images may be generated by simulating a desired parallax scanning pattern of the lens aperture and employing, for example, a ray tracing algorithm to produce the images. The images may be stored in computer memory on a frame-by-frame basis. The images may be retrieved from memory for display on a computer monitor, recorded on video tape for display on a TV screen, and/or recorded on film for projection on a screen.

Thus, in the method of the '347 patent, the point of view of a camera (e.g., the lens aperture) is moved to produce the parallax scanning information. The ray tracing method of image generation, as may be used by one embodiment of the method of the '347 patent, may be used to generate high quality computer images, such as those used in animated movies or special effects. Using this ray-tracing method to simulate optical effects such as depth of field variations, however, may require large amounts of computation and can place a heavy burden on processing resources. Therefore, such a ray tracing method may be impractical for certain applications, such as 3D computer games, animation, and other graphics applications, which require quick response.

Another previously mentioned U.S. Pat. No. 7,463,257 ("the '257 patent") discloses, inter alia, a method for parallax scanning through scene object position manipulation. Unlike the moving point of view methods taught in the '347 patent, the '257 patent teaches a fixed point of view, and scene objects are moved individually in a coordinated pattern to simulate a parallax scan. Even though the final images created using the '347 patent and the '257 patent may appear similar, the methods of generating these images are very different.

U.S. Patent Application Publication No. 2006/0203335 teaches, inter alia, methods for critically aligning images with parallax differences for autostereoscopic display. The process requires two or more images of a subject volume with parallax differences and whose visual fields overlap in some portions of each of the images. A first image with an area of interest is critically aligned to a second image with the same area of interest but with a parallax difference. The images are aligned by means of a software viewer whereby the areas of interest are critically aligned along their translational and rotational axes to converge at some point. This is accomplished by alternating views of each image at between 2 to 60 Hz and adjusting the axial alignment of each image relative to one another until a critical alignment convergence is achieved on a sub-pixel level at a point in the area of interest. Autostereoscopic viewing is achieved by alternately displaying (a.k.a. square-wave switching) a repetitive pattern of critically aligned parallax images between 3 and 6 Hz.

The historical and contemporary stereoscopic prior art teaches images captured from fixed (in the X horizontal axis) left and right points of view. Although disparity and convergence change, there is no provision for capture of sub-process visual information. Further, much of the parallax scanning, square-wave switching, and other parallax visualization prior art deals with capturing, simulating and/or presenting three-dimensional scenes in which objects and the environment are generally captured by a single camera lens (optical and/or virtual).

The present invention is directed to overcoming one or more of the problems associated with two lens stereoscopic imaging methods. For example, the presently disclosed embodiments may include the capability to capture non-horizontal parallax and other sub-process three-dimensional visual information in a manner that triggers a perceptional response that is not fatiguing to the viewer. In addition, stereoscopic parallax scanning can be used to simulate information captured by the eye's natural gaze and saccadic motions. This allows the combined stereoscopic (left and right views) display to present a variety of three-dimensional information to the viewer in a manner that will create a unified visual perception.

SUMMARY OF THE DISCLOSED EMBODIMENTS

One aspect of the invention is a method of using two parallax scanning points of view to capture left and right stereoscopic views for 3D display. The method includes establishing a right first parallax scanning point of view and field of view and a left second parallax scanning point of view. Both points of view are directed at a subject volume including a region of interest. The method includes reading at least one scene parameter associated with the field of view of the subject volume. The method includes determining parallax scan amplitudes, parallax scan pattern, parallax scan frequency, parallax scan direction(s), and/or the left and right stereoscopic disparity based on a value derived from at least one scene parameter. The method also includes generating and storing relevant metadata from said right and left parallax scanning points of view. The method includes displaying the recorded left and right parallax scanning point of view stereoscopically using conventional 3D projection or monitor displays. Additionally, one or more parallax scan parameters can be adjusted to trigger a sub-process perceptional response wherein the said region of interest appears realistically three-dimensional in all depth planes to a viewer on a standard 3D-aided display. Further, a single channel of the stereoscopic production can be distributed and displayed conventional 2D media as depth enhanced imagery.

BRIEF DESCRIPTION OF THE DRAWINGS

The accompanying drawings, which are incorporated in and constitute a part of this specification, represent exemplary features of the disclosed embodiments and, together with the written description, serve to explain the principles of operation of the disclosed embodiments. In the drawings:

FIG. 4 is a diagrammatic representation of a circular clockwise parallax scanning iris method according to an exemplary disclosed embodiment;

FIG. 5A is a diagrammatic representation of multiple parallax scan path patterns and arrangements according to an exemplary disclosed embodiment;

FIG. 6 is a diagrammatic representation of each frame in one cycle of two parallax scanning irises configured for circular clockwise 4.36 Hz synchronous image capture at 24 frames per second according to an exemplary disclosed embodiment;

DETAILED DESCRIPTION

The present disclosure relates to the stereoscopic imaging using parallax scanning points of view. In this context "stereoscopic" refers to traditional left/right 3D imaging techniques and methods. For purposes of this disclosure, the term "parallax scanning" refers the capture or generation and presentation over time of parallax data in a manner that exploits sub-process visual perceptional mechanism and will appear three-dimensional when viewed on conventional, unaided displays and enhances the three-dimensionality of stereoscopic displays. Parallax visualization refers to a form of autostereoscopic display that exploits certain (sub-process) short-term visual memory and depth mapping psychophysical visual mechanisms associated with human depth perception.

The advent of high resolution digital cinema camera systems like the Red One, marketed by Red.com, Inc., and the Alexa manufactured by the Arri Group have provided the means to make stereoscopic imaging more practical. The physical size of the cameras along with the ease and accuracy of the digital imaging workflow has reached a significant level of maturity. Conversely, camera mounting and alignment mechanisms combined with optical beamsplitting coatings have all come together to facilitate a renaissance in stereoscopic imaging. However, despite all the latest in digital capture and display technologies, current stereoscopic camera and display systems continue to exploit the same limited human perceptual mechanisms they have used for the last 110 plus years. This fact is the hardware has gotten better, but the human component remains the same. Applicants submit that stereoscopic parallax scanning is the first significant advance in the art of three-dimensional image perception since the introduction of color.

Figure 1:
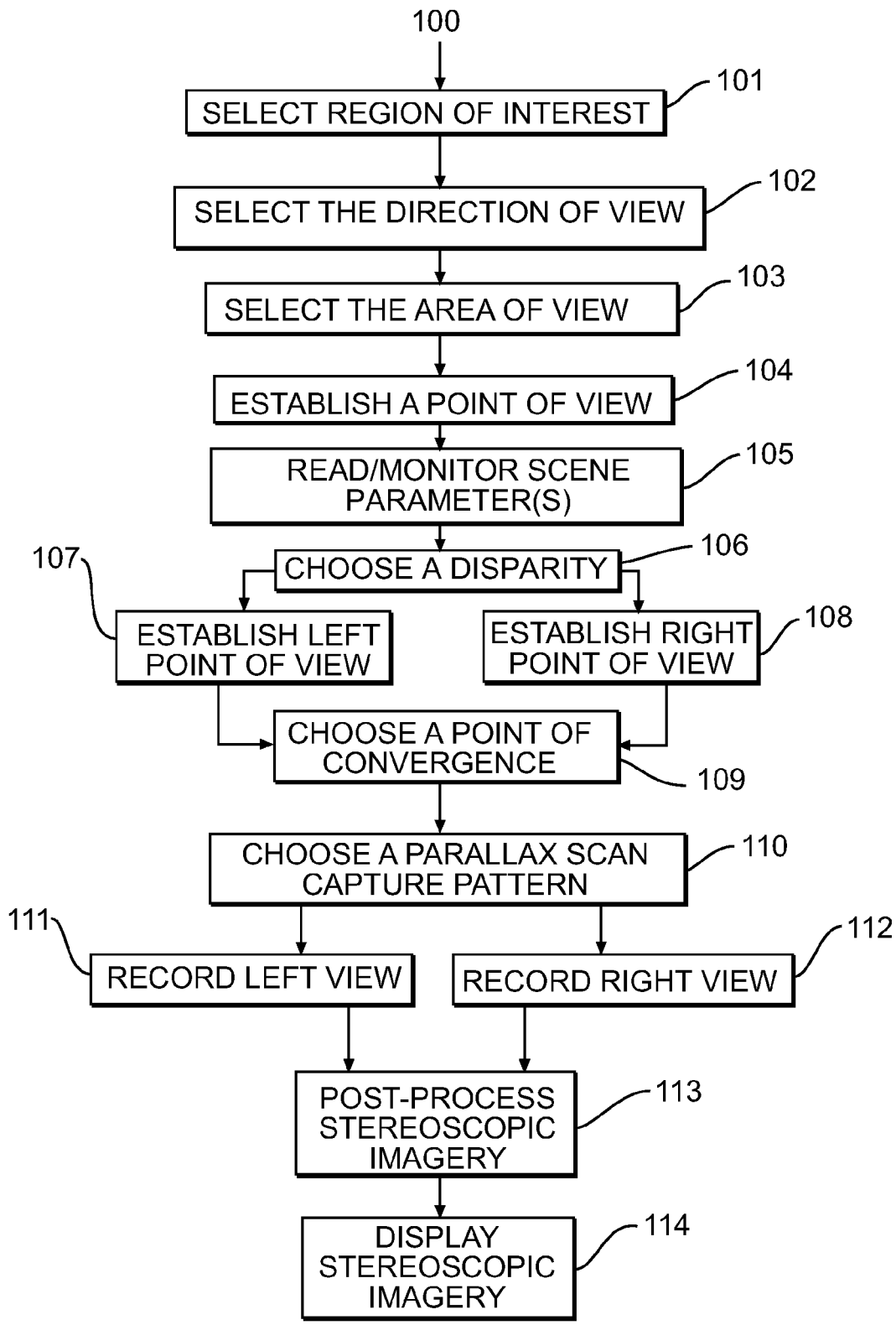
FIG. 1 is a flow chart representation of one parallax scanning stereoscopic image capture and display method according to an exemplary disclosed embodiment.

FIG. 1 provides a flow chart representation of a two-parallax-scanning-points-of-view stereoscopic image capture and display method according to an exemplary disclosed embodiment. Flow chart 100 outlines first steps in image capture using converged parallax scanning points of view (POV) of the presently disclosed embodiment. Step 101 includes the selection of a region of interest within the subject volume. Step 102 includes the selection of the direction of view, and step 103 includes the selection of the field of view. The field of view is typically determined by the focal length of the capture lens and format of the image capture sensor.

Step 104 includes establishing the first point of view. After a first point of view is determined, which establishes a zero (0) position and view plane. Step 105 reads and stores (as relevant metadata) a scene parameter(s) to determine initial left/right stereoscopic disparity which is subsequently set in Step 106. Scene parameters are metrics like lens focal length, focus distance, distance from closest object to sensor, sensor motion velocity, and other data. The data derived from the scene metrics can be applied to an algorithm(s) like those disclosed, inter alia, by Mayhew et al PCT/US2010/021627 to determine stereoscopic disparity Step 106 and point of convergence Step 109.

The product of Step 106 establishes the 107 left and 108 right points of view which are placed 90 degrees tangential to Step 104 zero point of view axis along which point of convergence 109 is established at intersection of Left 107 and Right 108 axes.

In subsequent Step 110 parallax scan amplitude, scan path pattern, scan direction(s), and scan frequency are among other things determined. Step 110 can be performed manually by eye or automatically using an algorithm(s) reading the metrics provided by Step 106 and values established in Steps 107-109. Steps 106, 109 and 110 can also be dynamic and constantly change values based on metrics received from Step 105. Disparity, convergence and parallax scan parameters can be linked and driven by values derived from an algorithm(s) as previously referenced.

Recording Steps 111 and 112 are elementary and can be accomplished by any number of methods available using traditional means like motion picture film, videotape, and/or digitally using digital storage devices.

Next Step 113 includes any production or postproduction process and image formatting technique that is accomplished to create a final parallax scanning stereoscopic image product. Step 114 is the act of displaying the final parallax scanning stereoscopic image product using any appropriate 3D display means. It should be noted that Steps 101 to 114 can include a live broadcast television production workflow.

Figure 2:
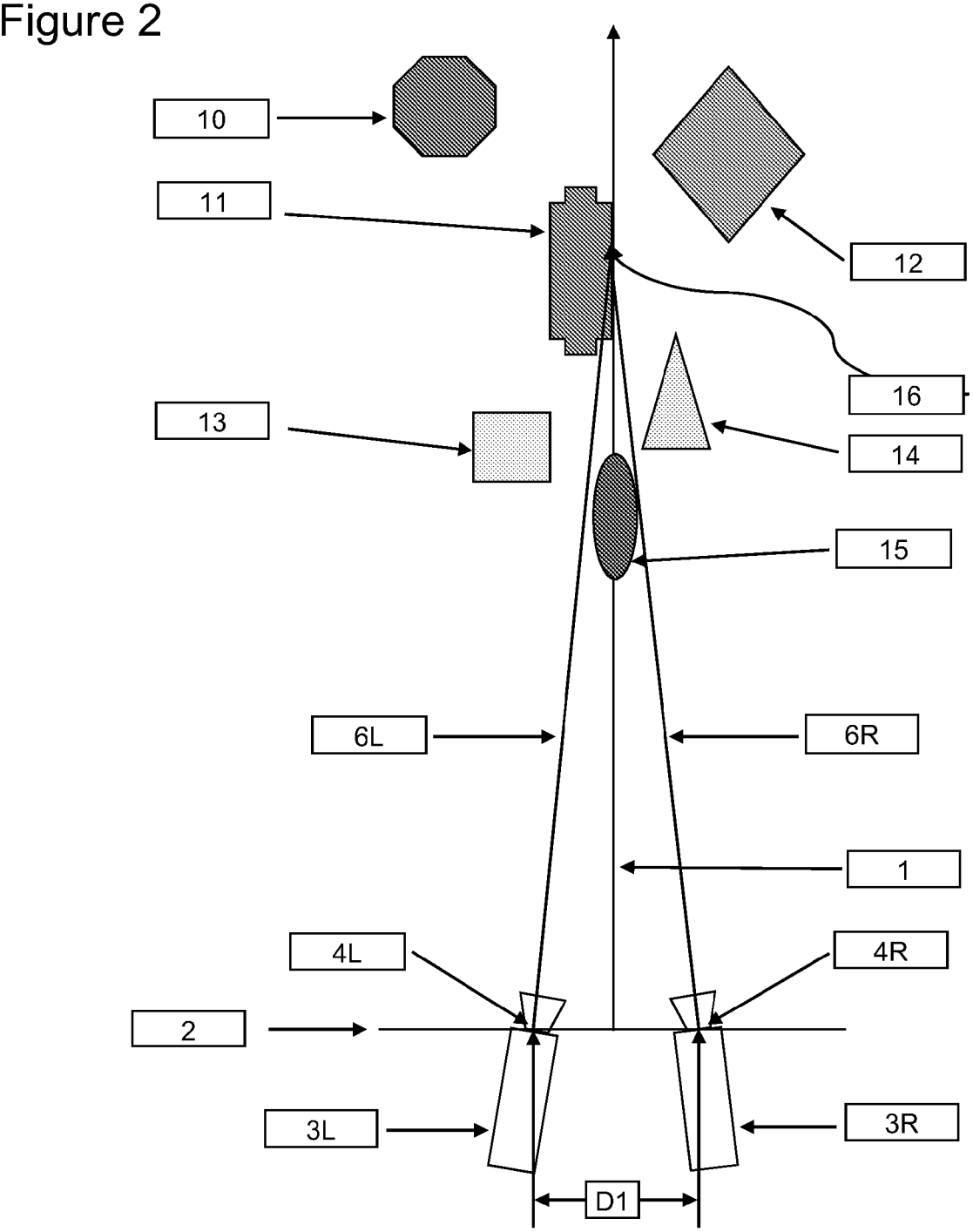
FIG. 2 is a diagrammatic representation of a converged stereoscopic camera layout method according to an exemplary disclosed embodiment.

FIG. 2 is a diagrammatic representation of a converged stereoscopic camera layout method according to an exemplary disclosed embodiment. The method represented by FIG. 2 is generally similar to the general stereoscopic method outlined by the flow chart of FIG. 1. In the method of FIG. 2, however, a center axis 1 is selected as a reference for establishing the view of an area of interest 11 and for determining the disparity between POV 4L and the POV 4R. Disparity distance D1 can be determined by a scene parameter (e.g. distance from view plane 2 to area of interest 11) using an algorithm(s) that will also derive point of convergence.

Figure 3:
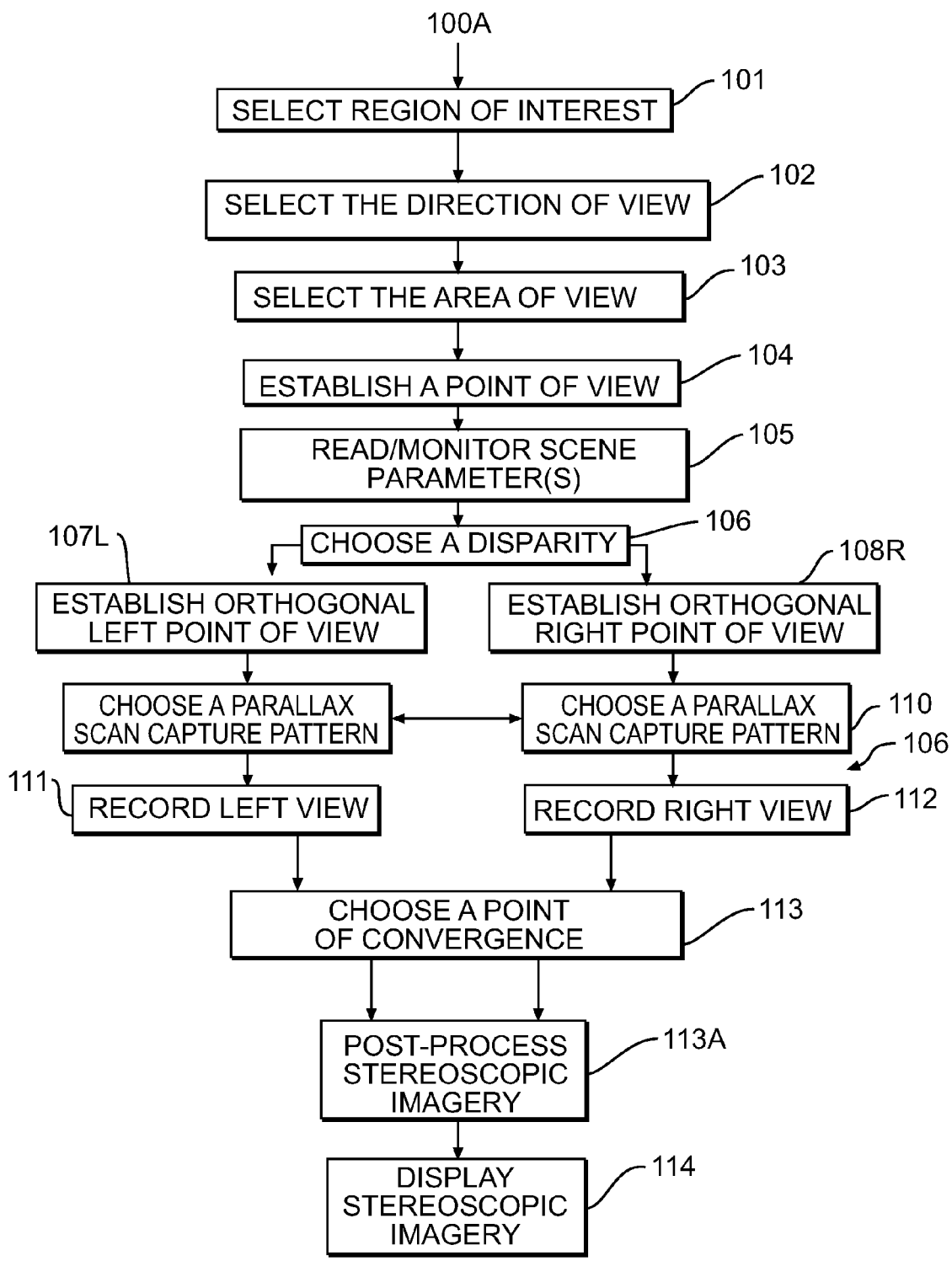
FIG. 3 is a flow chart representation of an alternative parallax scanning stereoscopic image capture and display method according to an exemplary disclosed embodiment.

FIG. 3 provides a flow chart 100A representation of a two-parallax-scanning-point-of-view stereoscopic image capture and display method according to an exemplary disclosed embodiment that is similar to the methods of FIG. 1 Flow Chart 100. However, Flow Chart 100A departs from the Flow Chart 100 method in that Steps 107L and 108R establish orthogonal points of view that are recorded by Steps 111 and 112. The establishing of a parallax scan setting Step 110 is the same as in Flow Chart 100.

Step 113 includes the process of converging the images captured from the 107L and 108R points of view by using a pixel translation or using an affine transformation process to bring a desired point in both images into a critical alignment using methods like those disclosed by, inter alia, Martin et al in U.S. Patent Application Publication No. 2006/0203335. The advantage of capturing the 107L and 108R points of view orthographically is that the left and right image convergence (Step 113) can be easily adjusted electronically after the views are recorded or dynamically while the images are being captured as in the case of live television. The process of convergence adjustment can be dynamic and driven by an algorithm reading scene parameters or as a result the action in the scene being recorded.

After convergence is set any production or postproduction process can accomplished at Step 113A and image formatting technique can be applied to create a final parallax scanning stereoscopic image product. Step 114 is the act of displaying the final parallax scanning stereoscopic image product using any appropriate 3D display means. It should be noted that Flow Chart 100A Steps 101 to 114 can also include a live broadcast television production workflow.

Figure 3A:
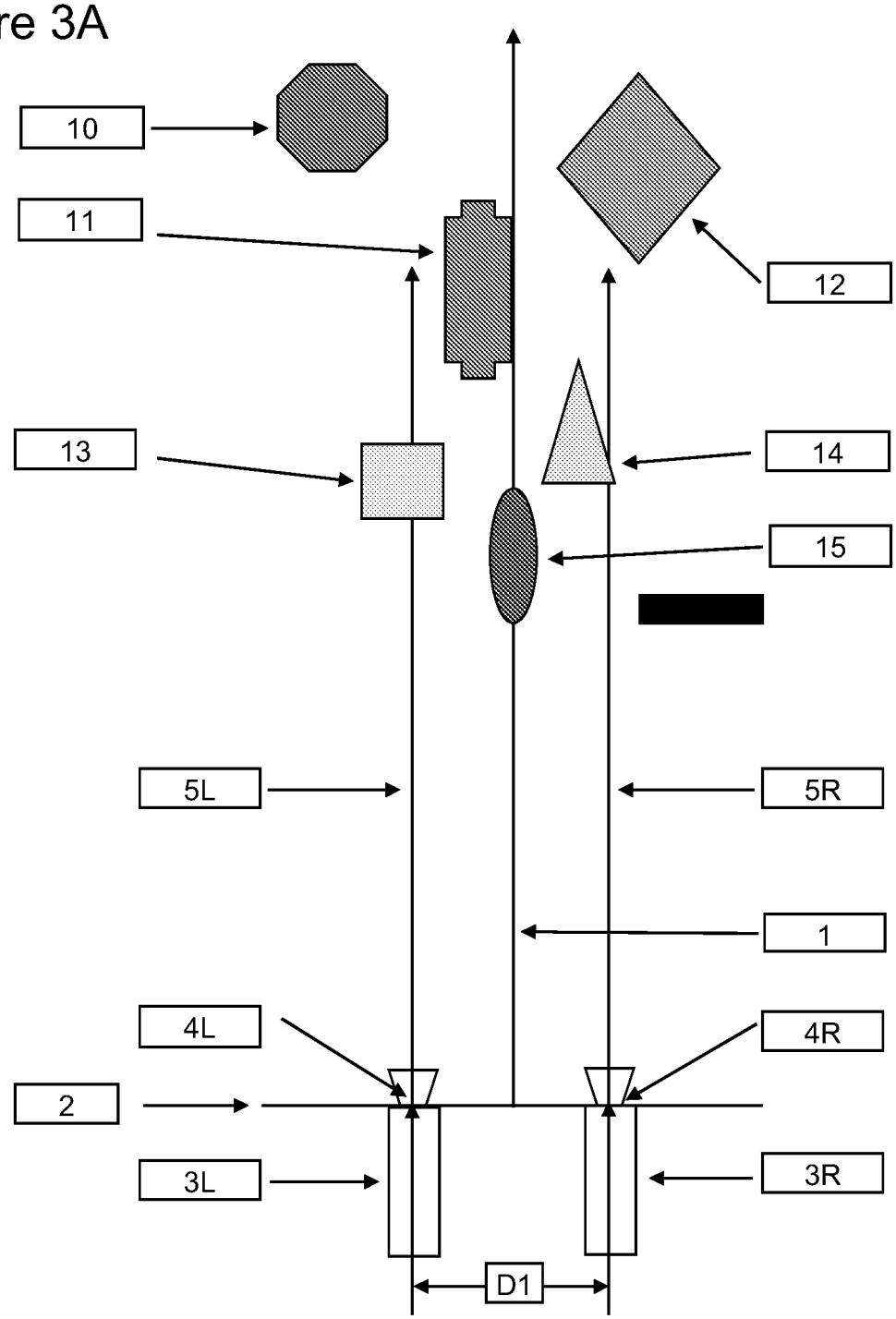
FIG. 3A is a diagrammatic representation of an orthogonal stereoscopic camera layout method according to an exemplary disclosed embodiment.

FIG. 3A is a diagrammatic representation of an orthogonal stereoscopic camera layout method according to an exemplary disclosed embodiment. Item 11 in is the region of interest. The first point of view axis is represented by Item 1. The disparity is the distance between 4L and 4R along view plane 2.

FIGS. 2 and 3A represent two basic stereoscopic camera layouts that are common in the industry. It is also common to use camera mounting systems that incorporate a folded optical path. Such configurations generally employ a beamsplitter at a 45 degree angle that allows the cameras to be configured at 90 degrees to one another, but capture images as if they were side-by-side albeit one camera sees a mirror image. For purposes of parallax scanning side-by-side or folded optical path mounting means are treated the same.

Parallax scanning can be accomplished using a Digital Parallax Scanner (DPS) mechanism like those disclosed, inter alia, by Mayhew et al U.S. patent application Ser. No. 11/547,714. The concept of parallax scanning using a moving iris is quite simple. FIG. 4 illustrates the basic operation. Item 128 represents the full aperture of a fully open iris of any given lens. Item 115 represents an iris setting approximately four f/stops smaller located at the center of the lens aperture. A parallax scanning iris 116 is offset some distance 115A from the lens center by some amplitude. The iris 116 scans through positions of parallax in a clockwise direction along a circular scan path 117. When the lens iris is moved off the center of the lens it sees a different point of view at the plane (i.e. parallax position) of focus. The amount the iris can be offset from the lens center is determined by the speed of the lens (maximum full iris) and the current iris setting. A parallax scanning lens can not scan at full iris. It is a hole moving inside another hole. If both holes are the same size there is nowhere to move. Parallax scanning functions best with lenses that are f/2.8 or faster and shooting iris is f/5.6 or smaller. However, parallax scanning can be quite effective at close focus with an f/stop that is one stop below full aperture.

A parallax scanning iris typically scans along a scan path at speeds of between 3 to 6 Hz. Empirical evidence suggests that the ideal scan frequency is 4.3 Hz. In order to trigger the appropriate visual psychophysical sub-process, parallax scan information should ideally be presented to the eye by the display at 4.3 Hz.

Figure 5:
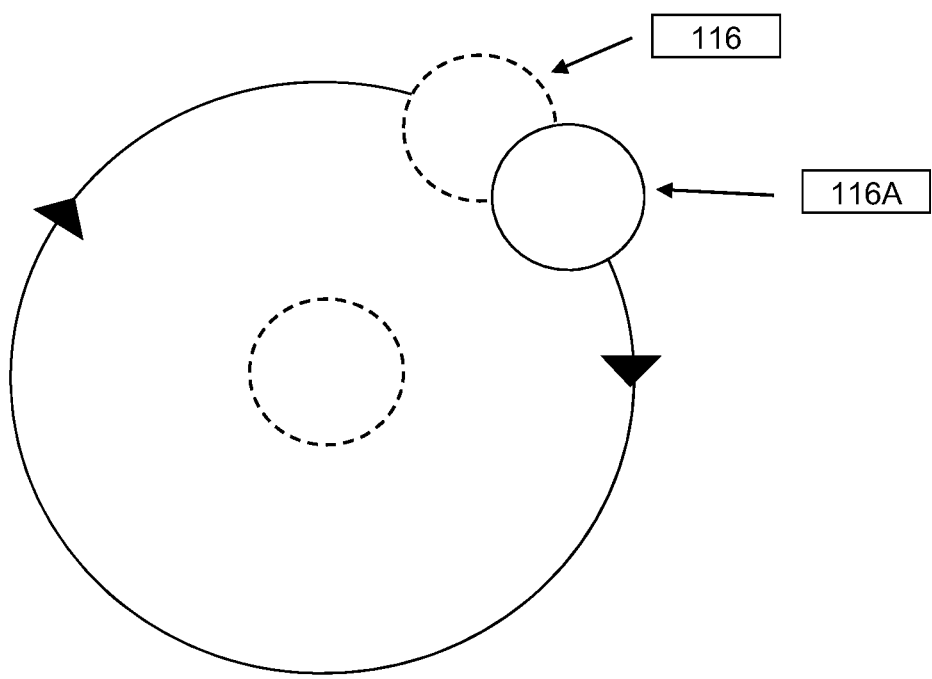
FIG. 5 is a diagrammatic representation of the iris travel in one frame along a circular clockwise parallax scan path segment according to an exemplary disclosed embodiment.

A parallax scanning iris is constantly in motion. FIG. 5 illustrates this concept. The iris travels along scan path 117 from position 116 to 116A some distance during sensor image capture interval. The continuous movement introduces an element of motion blur that is centered on a point in the center of the plane of focus. The amount of object blur is zero at the plane of focus and increases in amount as positions move forward and away from the point of focus. Parallax scan motion blur is very subtle and is directly dependent on the parallax scan amplitude, point of focus, image capture frame rate, the shutter angle, and exposure rate.

A parallax scan path is the route and pattern the iris travels frame-by-frame as it scans through a cycle inside the full lens aperture. The scan path can be a variety of different shapes and sizes depending on what is required by the operator. Simple shapes are used to set up a pattern that the iris can cycle through over and over again as the sensor captures image frames. Ordinarily in most parallax scanning applications the scan path is a circle, but additional patterns are also possible. FIG. 5A illustrates four examples. In Example 1, iris 138 travels in a clockwise direction along an oval scan path 118 set at 45 degrees to the image vertical Y axis. Example 2 illustrates a random clockwise scan path 119. This type of path is indicative of the iris scan path being determined and driven by an external source like for example a midi signal. Example 3 illustrates a simple vertical scan path 120 that provides for a reciprocating up and down motion for iris 138. Example 4 illustrates a large f/stop iris traveling along a slightly oval scan path 121.

Stereoscopic parallax scanning provides a stereographer with a variety of sub-process visual information capture tools with which to create a unified three-dimensional perception. The tools include, but are not limited to the following:
1. Parallax scan amplitude
2. Parallax scan frequency
3. Left/right parallax scan path pattern
4. Left/Right parallax scan direction
5. Left/Right parallax scan synchronization FIG. 6 illustrates a left and right parallax scan imaging sequence covering six frames. The left and right iris positions are indicated for each of six progressive frames in a left/right stereoscopic sequence. The positions represent the iris' set at smaller stop (say f/8) traveling along circular synchronous clockwise paths at 4.3 Hz that are contained in two lenses attached to sensors capturing images at 24 fps. The number of frames in a cycle can be determined by dividing the sensor capture rate (fps) by the parallax scan frequency as follows:

$$24/4.3 = 5.6$$

Figure 7:
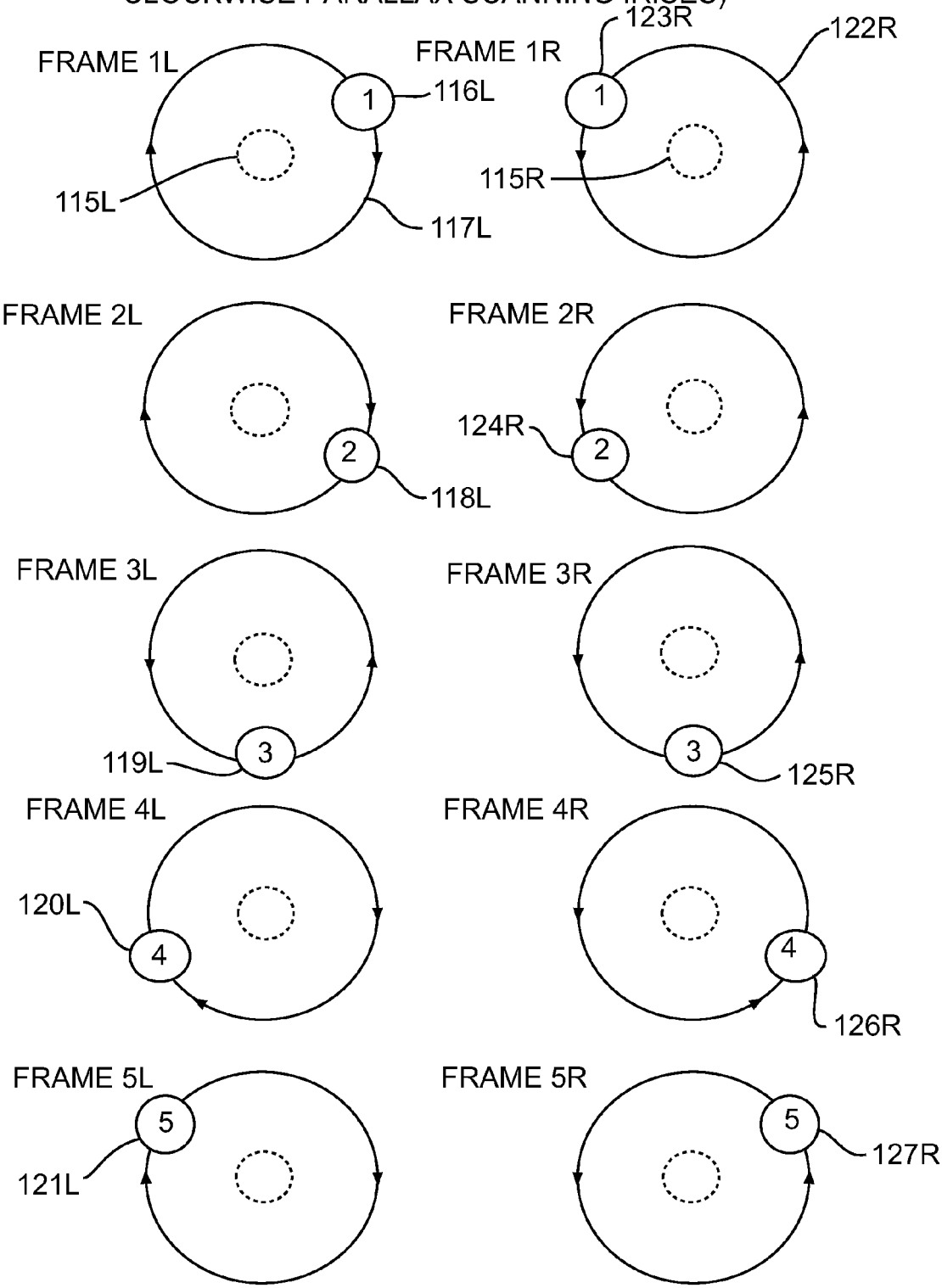
FIG. 7 is a diagrammatic representation of each frame in one cycle of two parallax scanning irises configured for circular left clockwise and right counter clockwise 4.36 Hz synchronous image capture at 24 frames per second according to an exemplary disclosed embodiment.
Figure 8:
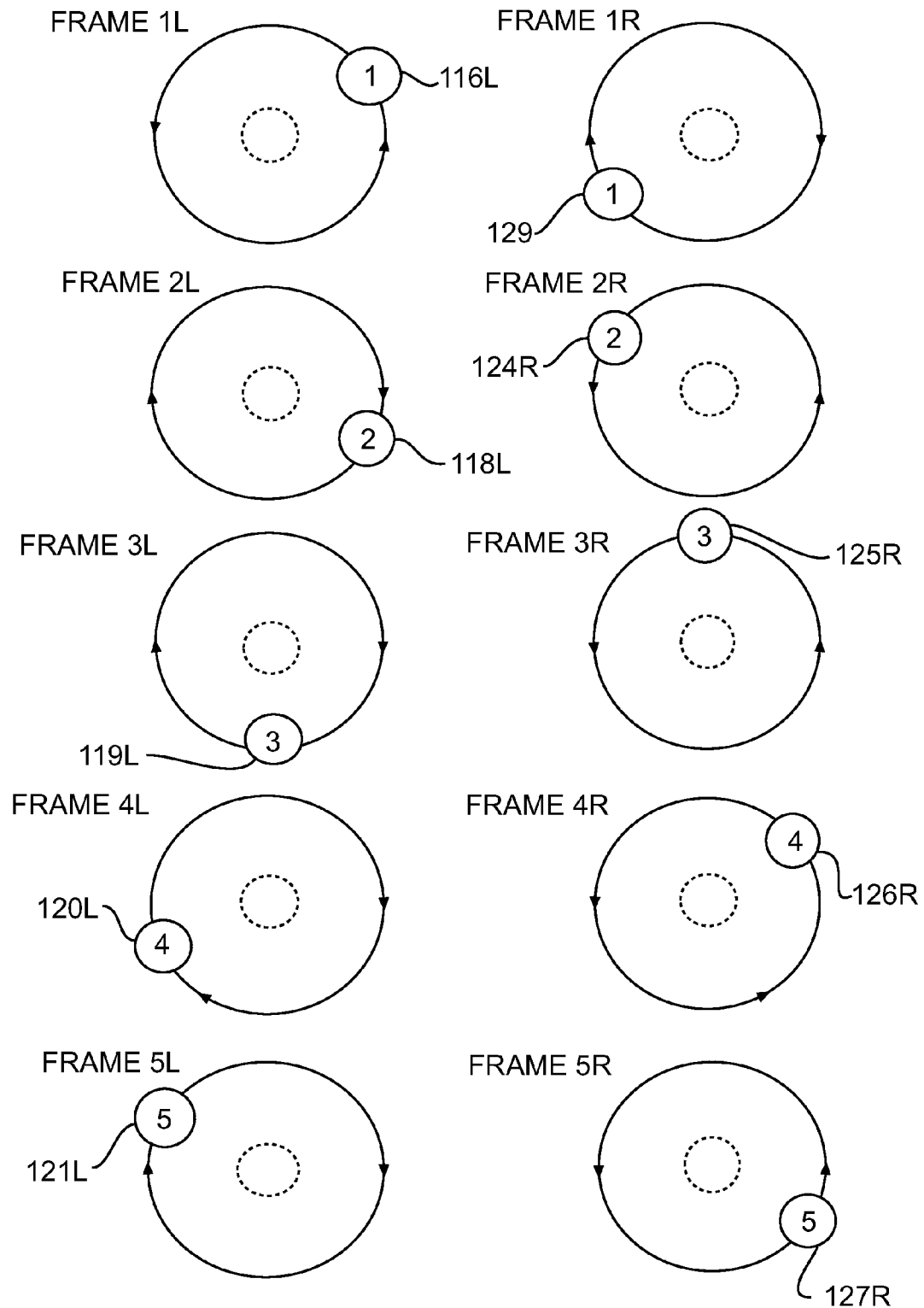
FIG. 8 is a diagrammatic representation of each frame in one cycle of two parallax scanning irises configured for circular left clockwise and right counter clockwise 4.36 Hz 180 degree out of phase image capture at 24 frames per second according to an exemplary disclosed embodiment.
Figure 9:
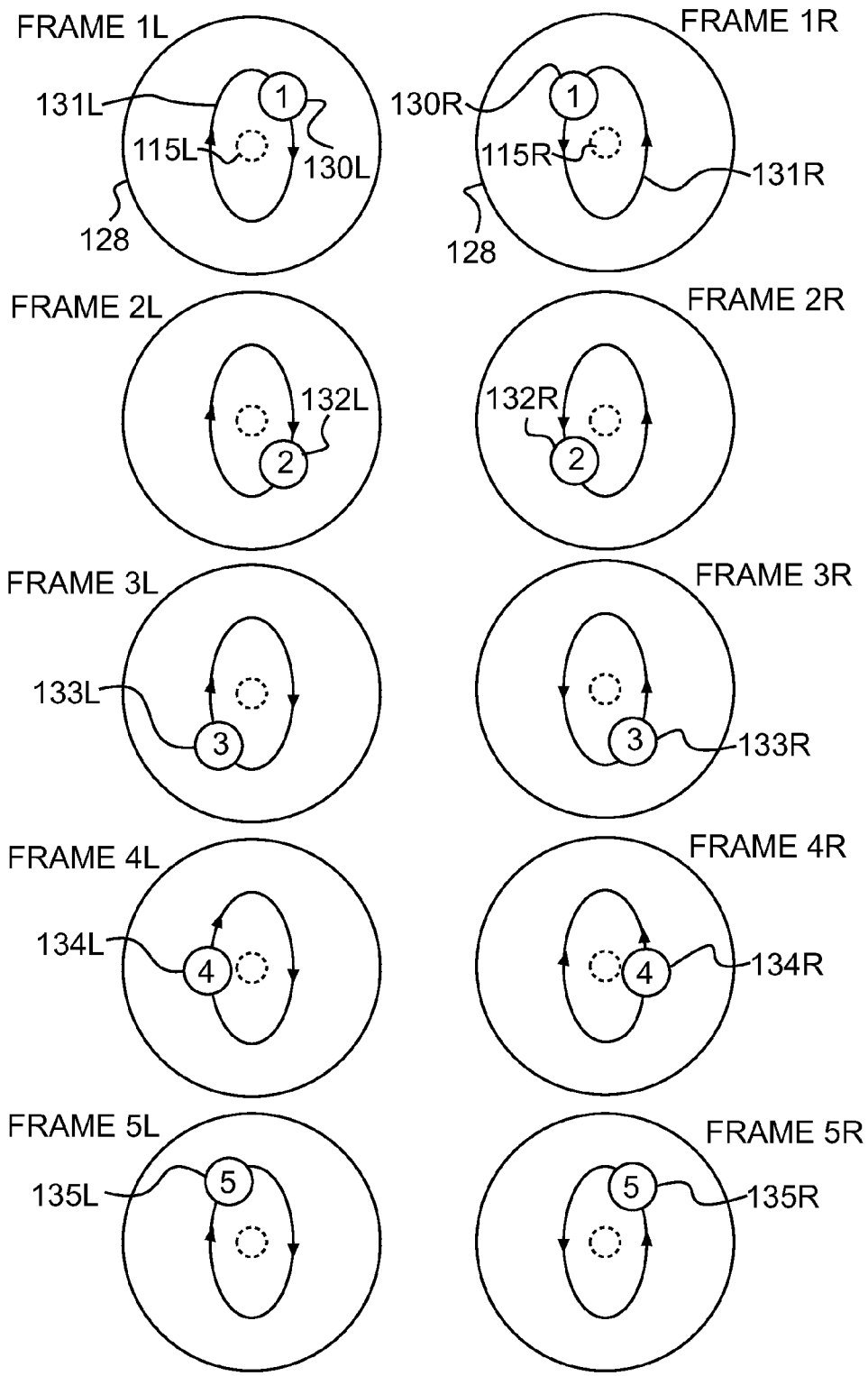
FIG. 9 is a diagrammatic representation of each frame in one ellipse (cat's eye) cycle of two parallax scanning irises configured for left clockwise and right counter clockwise 4.36 Hz synchronous image capture at 24 frames per second according to an exemplary disclosed embodiment.

FIG. 6 illustrates two parallax scanning lenses operating in a synchronous manner at 4.3 Hz with an f/8 iris setting scanning at an amplitude of approximately 75% of the full lens aperture. The iris position of each lens for every frame in the cycle is as follows:

Frame 1L depicts the left lens iris position for the first frame in a 5.6 frame clockwise circular parallax scan path cycle Frame 1R depicts the right lens iris position for the first frame in a 5.6 frame clockwise circular parallax scan path cycle Frame 2L depicts the left lens iris position for the second frame in a 5.6 frame clockwise circular parallax scan path cycle Frame 2R depicts the right lens iris position for the second frame in a 5.6 frame clockwise circular parallax scan path cycle Frame 3L depicts the left lens iris position for the third frame in a 5.6 frame clockwise circular parallax scan path cycle Frame 3R depicts the right lens iris position for the third frame in a 5.6 frame clockwise circular parallax scan path cycle Frame 4L depicts the left lens iris position for the forth frame in a 5.6 frame clockwise circular parallax scan path cycle Frame 4R depicts the right lens iris position for the forth frame in a 5.6 frame clockwise circular parallax scan path cycle Frame 5L depicts the left lens iris position for the fifth frame in a 5.6 frame clockwise circular parallax scan path cycle Frame 5R depicts the right lens iris position for the fifth frame in a 5.6 frame clockwise circular parallax scan path cycle Frame 6L depicts the left lens iris position for the last 0.6 frame in a 5.6 frame clockwise circular parallax scan path cycle Frame 6R depicts the right lens iris position for the last 0.6 frame in a 5.6 frame clockwise circular parallax scan path cycle FIG. 7 illustrates two parallax scanning lenses operating in a synchronous left clockwise master right counter clockwise mirror opposite manner at 4.3 Hz with an approximation of an f/8 iris setting scanning at an amplitude approximation of a 75% of the full lens aperture. The iris position of each lens for every frame in the cycle is as follows:

Frame 1L depicts the left lens iris position for the first frame in a 5.6 frame clockwise circular parallax scan path cycle Frame 1R depicts the right lens iris position for the first frame in a 5.6 frame counter clockwise circular parallax scan path cycle Frame 2L depicts the left lens iris position for the second frame in a 5.6 frame clockwise circular parallax scan path cycle Frame 2R depicts the right lens iris position for the second frame in a 5.6 frame counter clockwise circular parallax scan path cycle Frame 3L depicts the left lens iris position for the third frame in a 5.6 frame clockwise circular parallax scan path cycle Frame 3R depicts the right lens iris position for the third frame in a 5.6 frame counter clockwise circular parallax scan path cycle Frame 4L depicts the left lens iris position for the forth frame in a 5.6 frame clockwise circular parallax scan path cycle Frame 4R depicts the right lens iris position for the forth frame in a 5.6 frame counter clockwise circular parallax scan path cycle Frame 5L depicts the left lens iris position for the fifth frame in a 5.6 frame clockwise circular parallax scan path cycle Frame 5R depicts the right lens iris position for the fifth frame in a 5.6 frame counter clockwise circular parallax scan path cycle Frame 6L depicts the left lens iris position for the last 0.6 frame in a 5.6 frame clockwise circular parallax scan path cycle Frame 6R depicts the right lens iris position for the last 0.6 frame in a 5.6 frame counter clockwise circular parallax scan path cycle FIG. 8 illustrates two parallax scanning lenses operating in a synchronous left clockwise master right counter clockwise 180 degree out of phase opposite manner at 4.3 Hz with an approximation of an f/8 iris setting scanning at an amplitude approximation of 75% of the full lens aperture. The iris position of each lens for every frame in the cycle is as follows:

Frame 1L depicts the left lens iris position for the first frame in a 5.6 frame clockwise circular parallax scan path cycle Frame 1R depicts the right lens iris position for the first frame in a 5.6 frame counter clockwise 180 degrees out of phase circular parallax scan path cycle Frame 2L depicts the left lens iris position for the second frame in a 5.6 frame clockwise circular parallax scan path cycle Frame 2R depicts the right lens iris position for the second frame in a 5.6 frame counter clockwise 180 degrees out of phase circular parallax scan path cycle Frame 3L depicts the left lens iris position for the third frame in a 5.6 frame clockwise circular parallax scan path cycle Frame 3R depicts the right lens iris position for the third frame in a 5.6 frame counter clockwise 180 degrees out of phase circular parallax scan path cycle Frame 4L depicts the left lens iris position for the forth frame in a 5.6 frame clockwise circular parallax scan path cycle Frame 4R depicts the right lens iris position for the forth frame in a 5.6 frame counter clockwise 180 degrees out of phase circular parallax scan path cycle Frame 5L depicts the left lens iris position for the fifth frame in a 5.6 frame clockwise circular parallax scan path cycle Frame 5R depicts the right lens iris position for the fifth frame in a 5.6 frame counter clockwise 180 degrees out of phase circular parallax scan path cycle Frame 6L depicts the left lens iris position for the last 0.6 frame in a 5.6 frame clockwise circular parallax scan path cycle Frame 6R depicts the right lens iris position for the last 0.6 frame in a 5.6 frame counter clockwise 180 degrees out of phase circular parallax scan path cycle FIG. 9 illustrates two parallax scanning lenses operating in a synchronous left clockwise master right counter clockwise mirror opposite manner at 4.3 Hz with an approximation of an f/8 iris setting scanning on an elliptical vertically oriented scan path produced by a variable amplitude in the full lens aperture The methods detailed above can also be applied to synthetically generated stereoscopic imagery. The methods are substantially the same as in live-action imagery. A center point is selected as a reference for establishing the view of area of interest and also for determining the polar coordinates for the placement of the parallax scan points of view. Each point of view is determined, for example, by the separation (radius), the scan frequency, the current frame count, and the frame rate. As in live-action, the geometry of the scan path is typically elliptical or circular but can also include other geometries depending on the requirements of a particular application. The scan path may be random, algorithmic, or even determined by some external function like a sound source. Assuming the parallax scan path is a perfect circle, each successive point of view will have a constant angular separation defined as:

360 degrees/cycle*scan frequency (cycles/second)/frame rate (frames/second)

For example, a scan frequency of 4.4 Hz and a frame rate of 30 frames per second gives an angular separation of 360*4.4/30=52.8 degrees.

The progression of the polar coordinates of parallax scan points of view may be accomplished by assigning the first parallax scan position to the chosen initial angle and radius. Subsequent positions may be determined by adding a constant separation angle to the current position while maintaining a constant radius (or half separation). The polar coordinates for a particular frame in a sequence may be defined, for example, as:

(frame number*separation angle+initial angle, radius)

Here, the frame number counts from 0, the initial angle is determined by the situation or the requirements of the user, the separation angle is as defined as above, and the radius is the same as the half separation defined earlier. These polar coordinates may also be expressed as a Cartesian coordinate vector. For example, given a set of polar coordinates (angle, radius), and, assuming clockwise rotation with an angle of 0 aligned with the y-axis, one can calculate Cartesian coordinates (x,y) as (radius*sin(angle), radius*cos(angle)). A table illustrating the parallax scan polar angles for each frame for both 24 and 30 frames per second playback is provided in FIG. 4A.

Figure 4A:
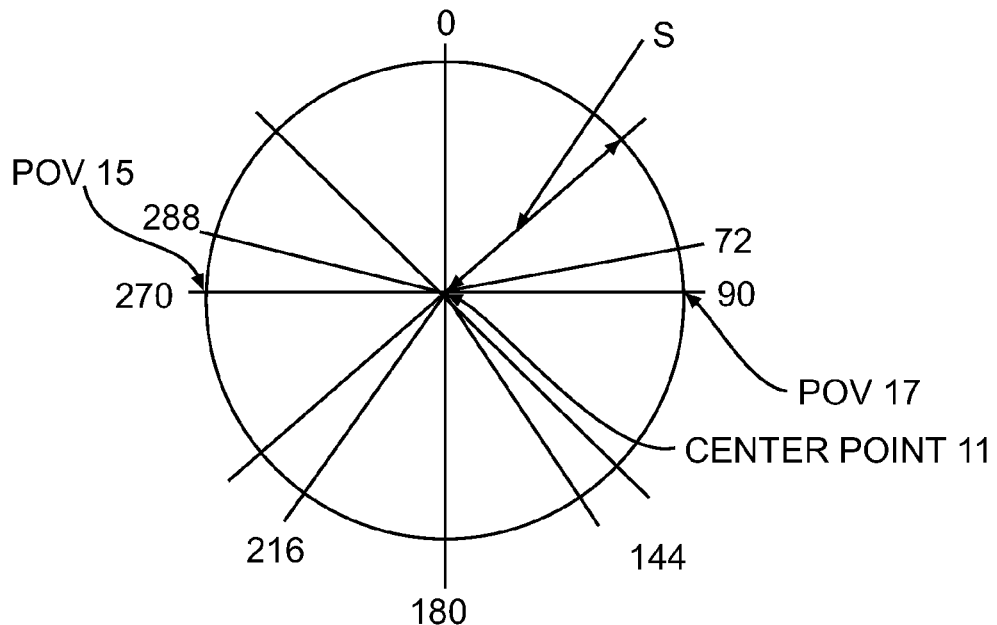
FIG. 4A depicts an exemplary circular scan path including exemplary parallax scan positions and a table including exemplary path scan angles for frame rates of 24 and 30 frames per second.

In the method represented by FIG. 4A, the offset distance S for each parallax scan position can be determined by a scene parameter, such as a distance $d_c$, in a manner similar to the square-wave methods discussed above. Each parallax scan position may be offset by value S from center point 11 and located in its proper position along the parallax scan path.

Applying the method of FIG. 4A, FIG. 5 illustrates the polar positions of a 4 Hz parallax scan at 24 frames per second. Shown in FIG. 5 is the center point 11 along with six points of view (POV 1 . . . POV 6). Each point of view is offset from the center point 11 by an offset distance S.

Next, the parallax view positions can be calculated. The primary effect from parallax depth-enhancement comes from the choice of the offset or view separation. A smaller view separation corresponds to a convergence point (apparent scene depth where there is no visible pixel motion from one frame to the next) that is closer to the camera, while a larger view separation corresponds to a convergence point that is farther from the camera. This is the inverse of the pixel separation, which is the number of pixels to shift each image to critically align them at the chosen convergence point. A smaller pixel separation corresponds to a convergence point that is farther from the camera, while a larger pixel separation corresponds to a convergence point that is closer to the camera.

There are several strategies that can be used for deciding where one wants the convergence to be in a series of images. One can use a fixed depth so that the convergence never changes from frame to frame. One can use an adaptive method, which tracks the objects in a region of visual interest, and can choose to converge on or near those objects. Or, one can choose to converge optimally for an entire scene by finding the range of depths of objects and empirically finding the "sweet spot" that brings the scene to life.

It should be noted that the methods of the presently disclosed embodiments, as described above, may be accomplished using any suitable computing device. For example, any of today's modern computers can be configured with appropriate software for executing the computational and display techniques described above. These methods may also be accomplished as part of a pre-processing or predetermined processing routine the results of which may be configured for later display on a user screen. Alternatively, or additionally, the described methods of generating and critically aligning images according to any of the methods described above may be accomplished in real-time or in near real-time by the viewer.

Additional advantages and modifications will readily occur to those skilled in the art. The invention in its broader aspects is, therefore, not limited to the specific details, representative algorithms and illustrative examples shown and described. Accordingly, departures may be made from such details without departing from the spirit or scope of applicants' inventive concept.

What is claimed is:

1. A computer-implemented method of stereoscopic imaging using two separate parallax scanning points of view, comprising:
    establishing a first point of view of a first parallax scanning optical device of a first stereoscopic camera, a second point of view of a second parallax scanning optical device of a second stereoscopic camera, and a field of view of a subject volume based on an overlap of the first point of view and the second point of view and including a region of interest, wherein the field of view of the subject volume is determined based on a first focal length of the first stereoscopic camera and a second focal length of the second stereoscopic camera;
    reading one or more scene parameters from each of the first and second stereoscopic cameras associated with the field of view of the subject volume;
    determining first stereoscopic parallax scan parameters for the first parallax scanning optical device and second stereoscopic parallax scan parameters for the second parallax scanning optical device based on the one or more scene parameters from each of the first and second stereoscopic cameras; and
    capturing and storing a plurality of parallax images at a plurality of parallax positions with the first and second parallax scanning optical devices using the respective determined first and second parallax scan parameters.

2. The method of claim 1, wherein optical axes associated with said first and second points of view are orthogonally located at left and right perpendicular positions along an x axis in a view plane directed at an area of interest and separated by a first distance.

3. The method of claim 1, wherein optical axes associated with said first and second points of view are separated by a first distance at left and right positions along an x axis in a view plane and converging at a point in an area of interest.

4. The method of claim 1, wherein the first and second parallax scanning devices comprise parallax scanning lenses.

5. The method of claim 1, wherein the read one or more scene parameters include a distance from one of the first and second points of view to a point in the region of interest.

6. The method of claim 1, wherein said first and second points of view are synchronous to one another.

7. The method of claim 1, wherein a rotation direction of said first parallax scanning device is clockwise and a rotation direction of said second parallax scanning device is counter clockwise and reversed synchronized relative to the first parallax scanning device.

8. The method of claim 1, wherein the first and second stereoscopic cameras are aligned for stereoscopic image capture and independently configured in the following parameters:
    iris f/stop setting;
    parallax scan path pattern;
    parallax scan path direction;
    parallax scan amplitude;
    parallax scan frequency;
    phase and synchronicity of first and second parallax scan paths;
    and images captured from said first and second stereoscopic cameras are displayed and viewed stereoscopically.

9. The method of claim 1, wherein the stored plurality of parallax images are displayed using a 3D stereoscopic display.

10. The method of claim 1, wherein the one or more scene parameters are received and the first and second parallax scan parameters are determined in real-time or in near real-time for use in live-action broadcast television.

11. The method of claim 1, further comprising:
    displaying the stored plurality of parallax images stereoscopically using a display.

12. The method of claim 11, wherein displaying the stored plurality of parallax images stereoscopically using a display comprises:
    converging the plurality of parallax images from said first and second points of view to create a stereoscopic image; and
    displaying the stereoscopic image using the display.

13. A method of stereoscopic synthetic computer generated imaging using two separate parallax scanning points of view, comprising:
    establishing a first point of view of a first parallax scanning optical device of a first stereoscopic camera, a second point of view of a second parallax scanning optical device of a second stereoscopic camera, and a field of view of a virtual subject volume based on an overlap of the first point of view and the second point of view and including a region of interest, wherein the field of view of the subject volume is determined based on a first focal length of the first stereoscopic camera and a second focal length of the second stereoscopic camera;
    reading one or more scene parameters from each of the first and second stereoscopic cameras associated with the field of view of the virtual subject volume;
    determining first stereoscopic parallax scan parameters for the first parallax scanning optical device and second stereoscopic parallax scan parameters for the second parallax scanning optical device based on a value derived from at least one of the one or more scene parameters from each of the first and second stereoscopic cameras; and
    rendering and storing a plurality of parallax images that are captured from a plurality of parallax positions with the first and second parallax scanning optical devices using the respective determined first and second parallax scan parameters.

14. The method of claim 13 wherein said virtual parallax scan parameters are varied in a manner similar to those used in live-action stereoscopic imaging.

15. The method of claim 13, further comprising:
   displaying the stored plurality of parallax images stereoscopically using a display.

16. The method of claim 15, wherein displaying the stored plurality of parallax images stereoscopically using a display comprises:
   converging the rendered and stored plurality of parallax images that are captured from the plurality of parallax positions to create a stereoscopic image; and
   displaying the stereoscopic image using the display.

\* \* \* \* \*